(12) United States Patent
Stukenholtz et al.

(10) Patent No.: US 7,927,201 B2
(45) Date of Patent: Apr. 19, 2011

(54) SYSTEM FOR UNLOADING AGRICULTURAL MATERIAL

(75) Inventors: Ty E. Stukenholtz, Nebraska City, NE (US); Jay E. Stukenholtz, Nebraska City, NE (US)

(73) Assignee: Cobco Manufacturing, Nebraska City, NE (US)

( * ) Notice: Subject to any disclaimer, the term of this patent is extended or adjusted under 35 U.S.C. 154(b) by 176 days.

(21) Appl. No.: 11/788,882

(22) Filed: Apr. 23, 2007

(65) Prior Publication Data

US 2008/0261671 A1  Oct. 23, 2008

(51) Int. Cl.
*A01F 12/60*  (2006.01)

(52) U.S. Cl. .......................................... 460/119

(58) Field of Classification Search .................. 460/119, 460/114, 111; 56/14.6; 414/502, 491; 198/605, 198/626.5
See application file for complete search history.

(56) References Cited

U.S. PATENT DOCUMENTS

| | | | | |
|---|---|---|---|---|
| 3,159,289 A * | 12/1964 | Tweedale | ....................... | 414/502 |
| 3,193,118 A * | 7/1965 | Tweedale | ....................... | 414/526 |
| 3,298,162 A * | 1/1967 | Medd | ............................... | 56/13.9 |
| 3,680,291 A * | 8/1972 | Soteropulos | .................... | 56/14.3 |
| 3,721,075 A * | 3/1973 | Weiberg | .......................... | 56/13.5 |
| 3,894,646 A * | 7/1975 | Head et al. | ...................... | 414/505 |
| 3,991,544 A * | 11/1976 | Allwood | .......................... | 56/344 |
| 4,231,431 A * | 11/1980 | Weichel | ........................... | 171/46 |
| 4,428,182 A * | 1/1984 | Allen et al. | ...................... | 56/14.6 |
| 4,717,308 A * | 1/1988 | Kuhns | ............................. | 414/307 |
| 4,928,460 A * | 5/1990 | Bruer et al. | ...................... | 56/14.6 |
| 5,327,708 A * | 7/1994 | Gerrish | ............................... | 56/1 |
| 5,380,142 A * | 1/1995 | Hornung et al. | ............... | 414/491 |
| 5,518,454 A * | 5/1996 | Twilley et al. | ..................... | 460/7 |
| 5,941,768 A * | 8/1999 | Flamme | ......................... | 460/114 |
| 6,012,272 A * | 1/2000 | Dillon | ............................. | 56/14.6 |
| 6,305,896 B1 * | 10/2001 | Szentimery | .................... | 414/502 |
| 6,358,141 B1 * | 3/2002 | Stukenholtz et al. | .......... | 460/100 |
| 6,604,353 B1 * | 8/2003 | Johnson | ........................... | 56/228 |
| 6,632,135 B2 * | 10/2003 | Matousek et al. | ............... | 460/23 |
| 6,712,691 B2 * | 3/2004 | McLeod | ........................... | 460/12 |
| 2007/0186530 A1 * | 8/2007 | Meier et al. | ..................... | 56/14.6 |

* cited by examiner

*Primary Examiner* — Arpád Fábián-Kovács
(74) *Attorney, Agent, or Firm* — Brett Trout

(57) ABSTRACT

An improved agricultural vehicle is provided utilizing an upper storage container, movable laterally relative to a lower storage container. The dual storage containers allows for ease of loading and unloading a combine with multiple types of agricultural materials, such as stover and corn kernels. The invention also allows grain wagons to carry two separate types of agricultural material, such as stover and corn kernels.

9 Claims, 9 Drawing Sheets

SYSTEM FOR UNLOADING AGRICULTURAL MATERIAL

BACKGROUND OF THE INVENTION

1. Field of the Invention

A system and method for moving agricultural material out of a container and, more specifically to a system and method for moving a floor of a container to transport agricultural material from the container.

2. Description of the Prior Art

It is known in the prior art to provide a container on an agricultural combine. A combine is an agricultural harvester/thresher, which removes agricultural material, such as chaff, stover, stover, switchgrass seed, grass seed, grass stems, wildflower seeds, leaves, flowers, other seeds, as well as other organic matter, from a field. Typically, the combine separates grain from the chaff, distributes the chaff back onto the agricultural field, and deposits the grain into a container. When it is desired to move the grain from the container to another vehicle or to a stationary storage container, an auger or other type of grain transport system is utilized to transport the grain out of the container. As the combine and the other container are often moving during this transport, it is desirable to provide a substantial amount of room between the combine and the other container. The auger transports the grain beyond the lateral dimensions of the combine for delivery to another container.

Some prior art combines, such as that described in U.S. Pat. No. 6,358,141, which is incorporated herein by reference, include a first tank for storage of grain and a second tank for storage of chaff, such as stover, for later use. While an auger may be utilized to move grain from a container, a separate auger for the chaff container would be undesirably expensive, bulky, and heavy and would require an undesired amount of maintenance. It would, therefore, be desirable to provide a system for emptying a container of chaff, such as stover, which is of a low cost, lightweight design, and easy to maintain.

It is also known in the prior art to provide grain wagons and other agricultural material transport vehicles. It is known to provide such vehicles with downward or rearward facing "doors," which may be opened to release the agricultural material from the container. While such downward or rearward facing doors work well for flowable materials such as grain, in circumstances which do not require the agricultural material to be transported a large lateral distance from the container, it would be desirable to provide a system for not only transporting agricultural materials, such as stover, from a combine container, but also to transport the stover laterally relative to the container to move the stover beyond the lateral dimensions of the combine and into another container positioned near the combine.

While, as noted above, an auger system may be utilized to transport grain in a sufficient horizontal direction to extend the grain flow beyond the lateral dimensions of the combine, providing such an auger system for the corn cob container would be unnecessarily heavy, expensive and difficult to maintain. It would, therefore, be desirable to provide a system and method for removing stover from a container which moved the stover beyond the lateral dimensions of the container and into another container positioned nearby. The difficulties encountered in the prior art discussed hereinabove are substantially eliminated by the present invention.

SUMMARY OF THE INVENTION

In an advantage provided in accordance with this invention, an agricultural container transport system is provided which is of a lightweight design.

Advantageously, an agricultural material container transport system is provided which is inexpensive.

Advantageously, an agricultural material container transport system is provided which may be retrofit onto existing combines.

Advantageously, an agricultural material container transport system is provided which allows a combine to collect agricultural material into two separate tanks and to transport agricultural material from each tank while in transit.

Advantageously, an agricultural material container transport system is provided which moves agricultural material in a lateral direction sufficient to extend the agricultural material beyond the lateral dimensions of a combine.

In an advantage provided by this invention, a mobile agricultural transport is provided which comprises a first container and a second container for storing agricultural material. At least one of the containers is provided with means for moving the floor of the container to transport agricultural material from the container to another container. In the preferred embodiment, the moving means is a chain conveyor which transports the agricultural material out of the container and into another container.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
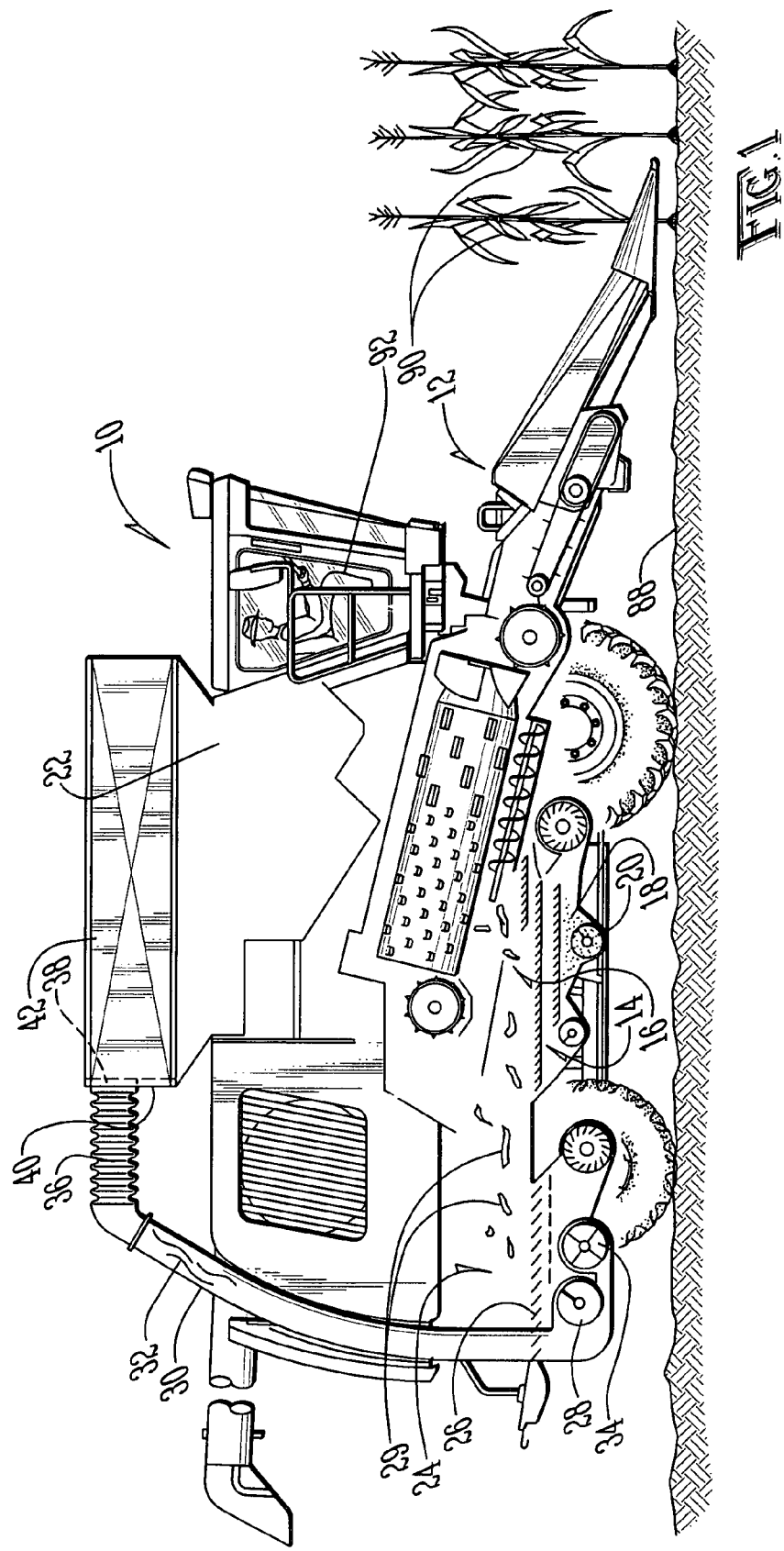
FIG. 1 illustrates a right elevation in partial cross-section of a combine system of the present invention.

A combine according to the present invention is shown generally as (10) in FIG. 1. The combine (10) is provided with an agricultural material collection system (12) such as a harvester/thresher known in the art. In the preferred embodiment, a John Deere STS series combine is utilized for the modifications. In the preferred embodiment, the collection system (12) includes sieves (14) for separating stover (16), which includes corn cobs from kernels of corn (18). As known in the art, the kernels of corn (18) are moved by an auger (20) for transportation of the kernels of corn (18) to a lower tank (22). As shown in FIG. 1, a sieve (24) is provided with a barbed surface (26). The sieve (24) is oscillated, and the barbed surface (26) acts to move stover (16) on the top sieve (24) toward an auger (28). The auger (28) delivers the stover (16) and chaff (29) to a duct (30) through which a flow of air (32) is provided by a blower (34). The duct (30) is provided with a flexible head (36) provided over a hole (38) provided in the rear sidewall (40) of an upper tank (42). Although in the preferred embodiment the combine (10) and collection system (12) are substantially similar to that described in U.S. Pat. No. 6,358,141, any type of combine or collection system may be utilized. Alternatively, the combine (10) and collection system (12) may be eliminated altogether and the invention used in association with an agricultural material transport vehicle or wagon as described below.

Figure 2:
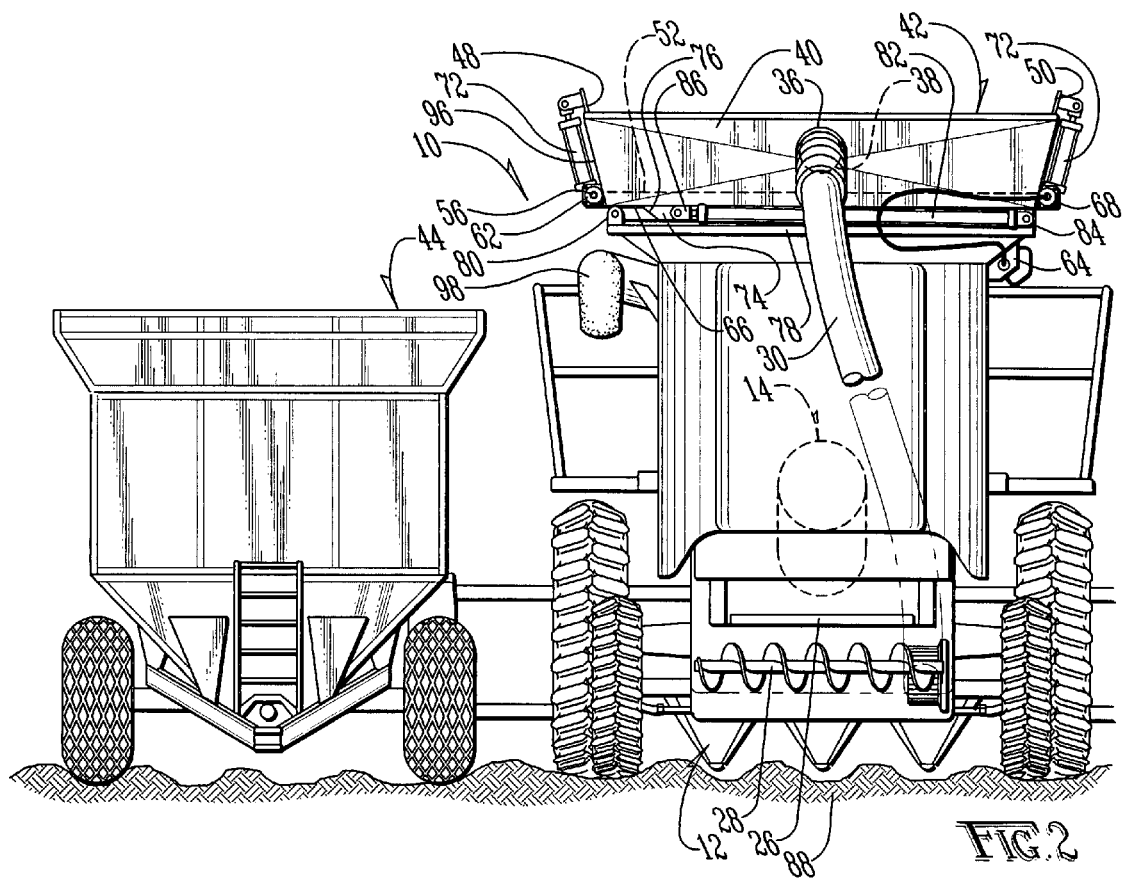
FIG. 2 illustrates a rear elevation of the combine of FIG. 1 in partial cutaway, positioned beside a grain wagon.

As shown in FIGS. 1-2, the flexible head (36) is preferably bolted over the hole (38). The flexible head (36) is preferably provided with a square cross-section to prevent agricultural material from becoming stuck therein. The flexible head (36) is also preferably pivotable and telescopic to turn and extend as the upper tank (42) moves. This allows the upper tank (42) and rear sidewall (40) to move laterally without dislodging the flexible head (36) from over the hole (38). Alternatively, the entire duct (30) and the flexible head (36) may be constructed of a flexible material. Securing the flexible head (36) over the hole (38) in the rear sidewall (40) allows the upper tank (42) to continue collecting stover (16) as the upper tank (42) is being unloaded.

Figure 3:
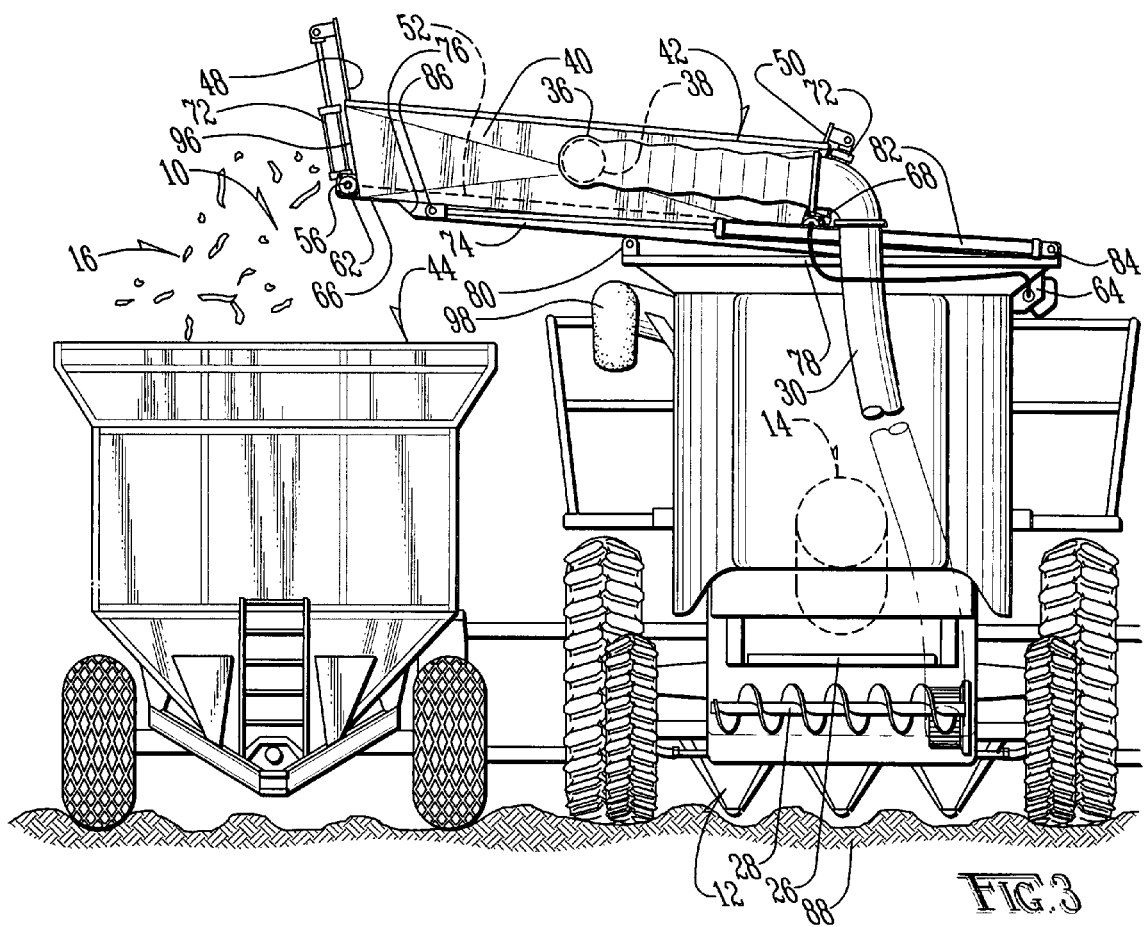
FIG. 3 illustrates a rear elevation of the combine of FIG. 2 in partial cutaway, transporting stover into a grain wagon.

As shown in FIGS. 1-3, as the combine (10) moves through the field, the collection system (12) collects and separates the stover (16) and chaff (29) from the kernels of corn (18). Thereafter, the stover (36) move through the combine (10) up the duct (30) and into the upper tank (421) through the hole (38). Once the upper tank (42) has become filled, or it is otherwise desired to empty the upper tank (42) of stover (16), the combine (10) is moved along side an agricultural wagon (44) or the like, such as those known in the art.

Figure 4:
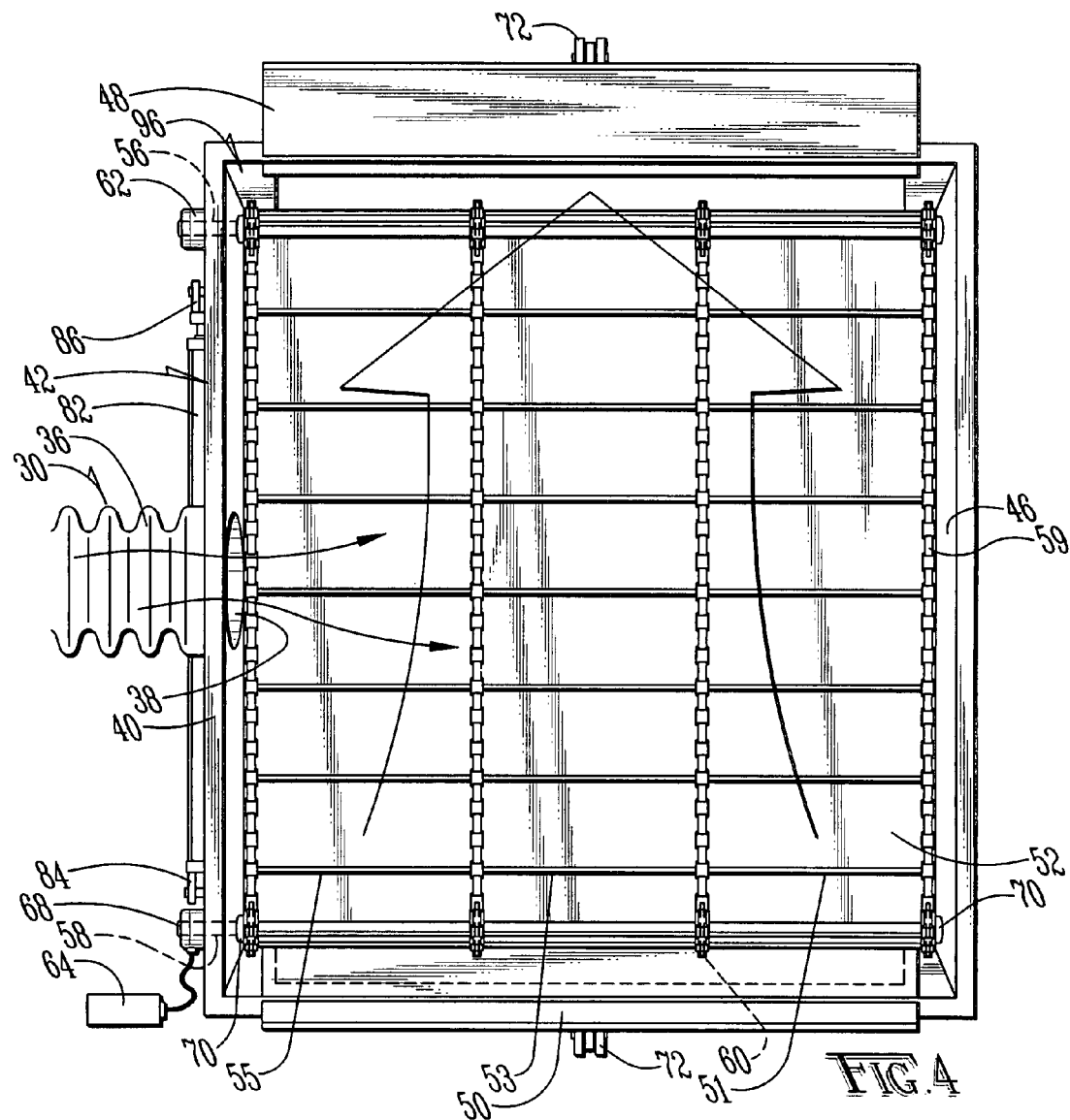
FIG. 4 illustrates a top elevation of the upper container of the combine of the present invention.

As shown in FIG. 4, the upper tank (42) is provided with a rear sidewall (40), a front sidewall (46), a left sidewall (48) and a right sidewall (50). In the preferred embodiment, the floor (52) of the upper tank (42) includes a solid base floor (66) and three sets of chain conveyors (51), (53) and (55). The base floor (66) extends under and beyond the right and left sidewalls (48) and (50) constructed of a plurality of interlinked steel loops (54). The base floor (66) is preferably between 0.5 and 5.0 square meters in area, more preferably between 0.75 and 3.0 square meters in area and, most preferably, approximately 1.1 square meters in area. The sidewalls (40), (46), (48) and (50) are preferably angled upward and slightly outward from the base floor (66), defining a depth of the upper tank (42) to approximately one meter. The upper tank (42) may be covered or open as desired.

Journaled to shoulder bushings (70) provided on the edges of the floor (52) are a first axle (56) and second axle (58). The axles (56) and (58) are each provided with a plurality of sprockets (60) which engage the side chains (54) of the chain conveyors (51), (53) and (55). The first axle (56) is coupled to a hydraulic motor (62) driven by the hydraulic systems (64) of the combine (10).

As shown in FIG. 4, the left sidewall (48) and right sidewall (50) are slidably coupled to the upper tank (42) and coupled to hydraulic pistons (72) driven by the hydraulic system (64) of the combine (10). When the hydraulic pistons (72) are actuated, the left sidewall (48) and right sidewall (50) may be alternately raised and lowered to allow the upper tank (42) to be emptied.

As shown in FIG. 3, coupled to the bottom of the upper tank (42) are a pair of rails (74) running below the rear sidewall (40) and front sidewall (46). The rails (74) are each provided with tapered ends (76) which rest upon a steel frame (78). The steel frame (78) may be secured to the combine (10) by weldments or the like. Coupled to the steel frame (78) are a pair of rollers (80) secured in alignment with the rails (74). As shown in FIG. 3, hydraulic pistons (82) driven by the hydraulic system (64) of the combine (10) are pivotably secured on one end (84) to the steel frame (78) and pivotably secured on the other end (86) to the rails (74). Alternatively, large chains (not shown) may couple the upper tank (42) by sprockets to a hydraulic motor secured to the combine (10) to allow the upper tank (42) to be extended in either direction.

When it is desired to utilize the materials transport system of the present invention, the combine (10) is moved through an agricultural field (88) collecting ears of corn (90). The collection system (12) separates the kernels of corn (18) from the stover (16). The auger (28) moves the stover (16) to the duct (30), where the airflow (32) from the blower moves the stover (16) through the duct and into the upper tank (42). Locating the upper tank (42) above the lower tank (22), allows the operator (92) to see the upper tank (42) during collection and positions the upper tank (42) in a location where the combine (10) is designed to carry the most weight. The visibility of the upper tank (42) to the operator (92) is especially desirable during the unloading process described below.

When the upper tank (42) becomes full of agricultural material such as stover (16), or it is otherwise desired to unload the upper tank (42), the agricultural wagon (44) is positioned adjacent the combine (10). The combine (10) and wagon (44) may either be stationary, or the unloading process may be accomplished while both the combine (10) and wagon (44) are moving. When it is desired to unload the upper tank (42), the operator (92) actuates the hydraulic pistons (82) to extend the upper tank (42) relative to the steel frame (78). (FIGS. 1-3). As the upper tank (42) moves laterally, the tapered ends (76) of the rails (74) contact the rollers (80), moving the upper tank (42) up and over the rollers (80) as shown in FIG. 3. The hydraulic pistons (82) continue to extend the upper tank (42) until the upper tank (42) is sufficiently cantilevered over the combine (10) so as to allow stover (16) exiting from the left side (96) of the upper tank (42) to clear the grain auger (98) provided on the combine (10).

Once the upper tank (42) has been extended the desired distance, the hydraulic pistons (72) are actuated to raise the left sidewall (48). As the left sidewall (48) rises, stover (16) begin to fall from the upper tank (42) into the wagon (44). The extension of the upper tank (42) relative to the steel frame (78) preferably angles the upper tank (42) slightly upward. To fully evacuate the upper tank (42), the hydraulic motor (62) is actuated by the operator (92) to rotate the first axle (56) and begin moving the chain conveyors (51), (53) and (55) of the upper tank (42). The chain conveyors (51), (53) and (55) move stover (16) within the upper tank (42) off of the base floor (66) and into the wagon (44).

The hydraulic motor (62) continues to rotate the first axle (56) and move the chain conveyors (51), (53) and (55) until the upper tank (42) is sufficiently emptied. Once the unloading has stopped, the operator (92) actuates the hydraulic pistons (72) to close the left sidewall (48) and then actuates the hydraulic pistons (82) to retract the upper tank (42) back onto the steel frame (78), as shown in FIG. 2.

The moveable upper tank (42) of the present invention allows the operator (92) to collect two types of agricultural material with a single pass of the combine (10) through the agricultural field (88). If desired, the upper tank (42) may be used to harvest seed crops that are not easily conveyed out of the lower tank (22) of a standard combine (10). Materials such as grass seed, having low bulk density, tend to push against itself, creating bridges and cavities within the lower tank (22), preventing the auger (20) from conveying the material to the grain auger (98). By moving such light seed crops to the upper tank (42), the collection process avoids bridging and cavitation of the grass seed during collection and unloading.

Figure 5:
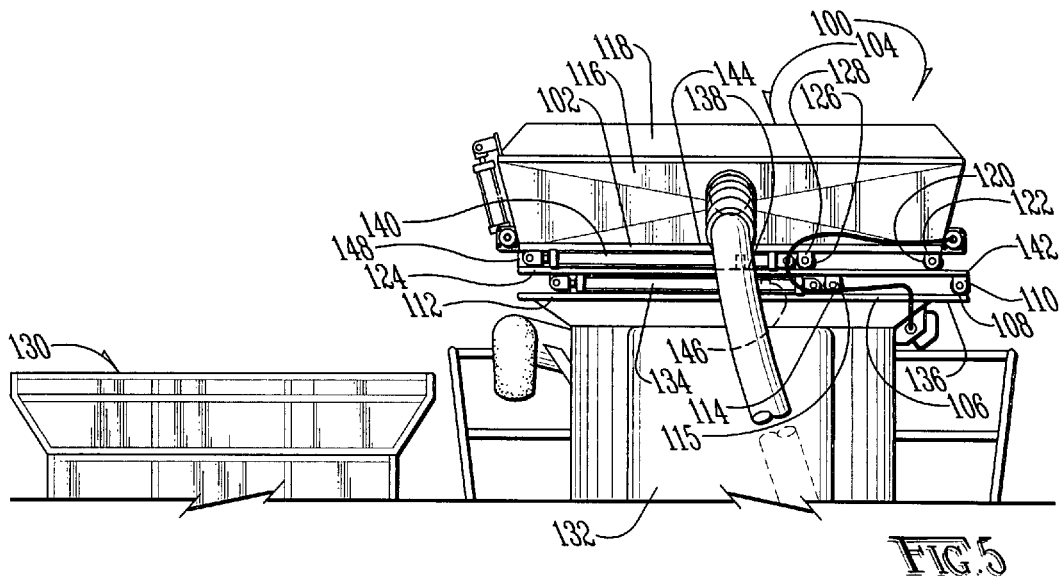
FIG. 5 illustrates a rear elevation of an alternative embodiment of the combine of the present invention in partial cutaway, positioned beside a grain wagon.

An alternative embodiment of the present invention is shown generally as (100) in FIG. 5. In this embodiment of the present invention, the floor of the upper tank (104) is generally flat and coupled to the steel frame (106) by a pair of grooved wheels (108), coupled to the floor (102) by a pair of shoulder brackets (110). The grooved wheels (108) fit into tracks (112) cantilevered over the top of the steel frame (106). The floor (102) is also preferably provided with a pair of supplemental grooved wheels (114) coupled to the floor (102) with a pair of supplemental shoulder brackets (115). Coupled to the rear sidewall (116) and front sidewall (118) are a pair of grooved wheels (120) coupled to the rear sidewall (116) and front sidewall (118) by a pair of shoulder brackets (122). The grooved wheels (120) ride along tracks (124) cantilevered outward from the top of the floor (102). Supplemental grooved wheels (114) are coupled to the rear sidewall (116) and front sidewall (118) by supplemental shoulder brackets (128).

Figure 6:
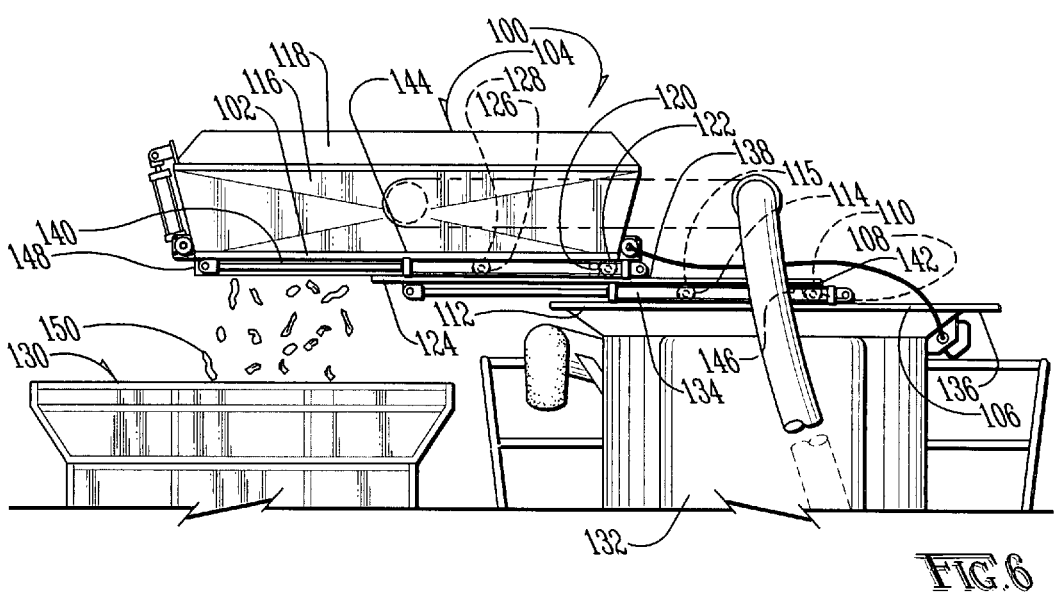
FIG. 6 illustrates a rear elevation of the combine of FIG. 5 in partial cutaway, transporting stover into a grain wagon.

As shown in FIG. 6, when it is desired to empty the upper tank (104), a wagon (130) is pulled alongside the combine (132). A pair of hydraulic pistons (134) coupled between one end (136) of the steel frame (106) and a midsection (138) of the floor (102). A supplemental set of hydraulic pistons (140) are coupled between one and (142) of the floor (102) and a mid-point (144) of the upper tank (104). As shown in FIG. 6, when the first set of hydraulic pistons (134) are actuated, the floor (102) extends relative to the steel frame (106) until the supplemental grooved wheels (114) contact a pair of stops (146) provided on the steel frame. The stops (146) may be constructed of rubber bumpers or any suitable material known in the art.

Additionally, as the hydraulic pistons (140) actuate, they push the upper tank (104) laterally relative to the floor (102). Accordingly, when it is desired to empty the upper tank (104), the hydraulic pistons (134) are actuated to position the end (148) of the floor (102) over the wagon (130). Thereafter, the hydraulic pistons (140) are actuated to move the upper tank (104) relative to the floor (102). As shown in FIG. 6, as the upper tank (104) moves relative to the floor (102), the upper tank (104) pushes the stover (150) off of the floor (102), whereafter the stover (150) fall from the upper tank (104) into the wagon (130).

Figure 7:
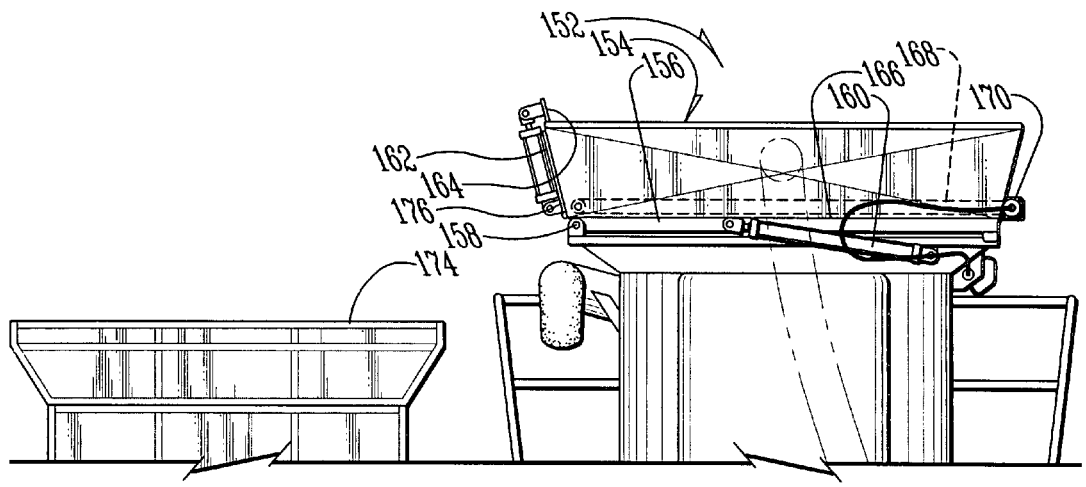
FIG. 7 illustrates a rear elevation of still another alternative embodiment of the combine of the present invention in partial cutaway, positioned beside a grain wagon.

In yet another alternative embodiment of the present invention, shown generally as (152) in FIG. 7, the upper tank (154) is pivotally coupled to a steel frame (156) by one or more hinges (158). Coupled between the steel frame (156) and upper tank (154) are a pair of hydraulic pistons (160). Additionally, hydraulic pistons (160) are coupled between the upper tank (154) and the left sidewall (162) in a manner such as that described above. As shown, the upper tank (154) may be provided with a floor (166) comprised of steel loops (168) driven by a hydraulic motor (170) in a manner such as that described above. Alternatively, the floor (166) may be smooth and rely on gravity to move stover (172) out of the upper tank (154) into the grain wagon (174).

Figure 8:
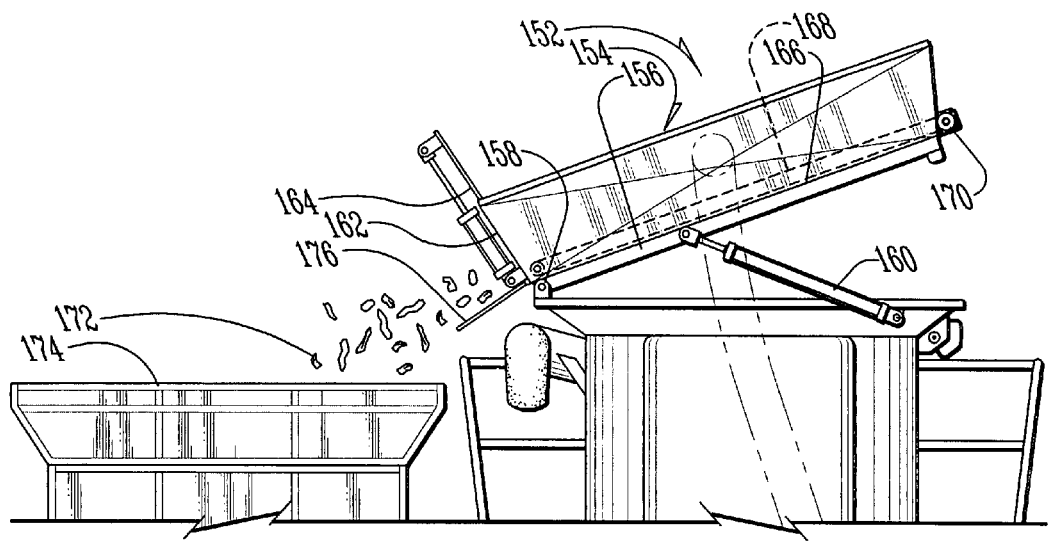
FIG. 8 illustrates a rear elevation of the combine of FIG. 7 in partial cutaway, transporting stover into a grain wagon.

As shown in FIG. 8, when it is desired to empty the upper tank (154), the hydraulic pistons (160) are actuated to pivot the upper tank (154) upward relative to the steel frame (156). The hydraulic pistons (162) are actuated to lift the left sidewall (164) which is slidably coupled to the upper tank (154). As the left sidewall (164) rises, the hydraulic motor (170) may be actuated to motivate the stover (172) out of the upper tank (154) past the left sidewall (164) and into the wagon (174). The upper tank (154) may be provided with a lip (176) to launch the stover (172) outward from the upper tank (154). Alternatively, as noted above, the floor (166) may be provided with a sufficiently slick surface to allow the inclination of the floor (166) and the force of gravity to drive the stover (172) from the upper tank (154) into the wagon (174).

Figure 9:
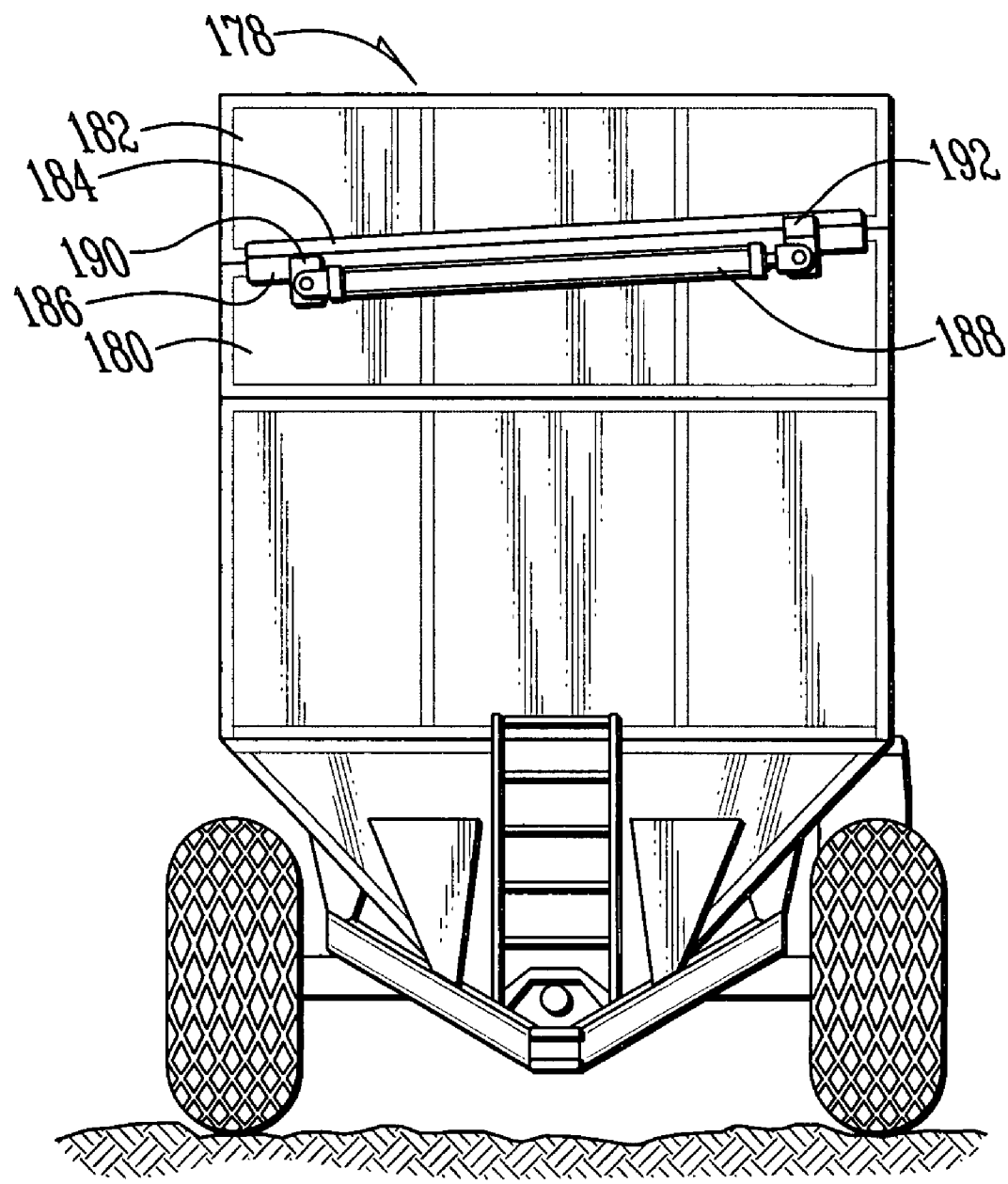
FIG. 9 illustrates a front elevation of a grain wagon of the present invention in partial cutaway, positioned beside a combine of the present invention.

Another embodiment of the present invention is shown generally as (178) in FIG. 9. As shown in FIG. 9, a grain wagon (178) is provided with a lower tank (180) angled and slidably coupled relative to an upper tank (182). Although the upper tank (182) may be coupled to the lower tank (180) in any manner known in the art, in the preferred embodiment, the upper tank (182) is coupled to the lower tank (180) by cantilevered tracks (184) and (186), which fit into mating engagement with one another. Coupled to the lower tank (180) are a pair of hydraulic pistons (188) coupled between one end (190) of the lower tank (180) and a portion (192) of the upper tank (182).

Figure 10:
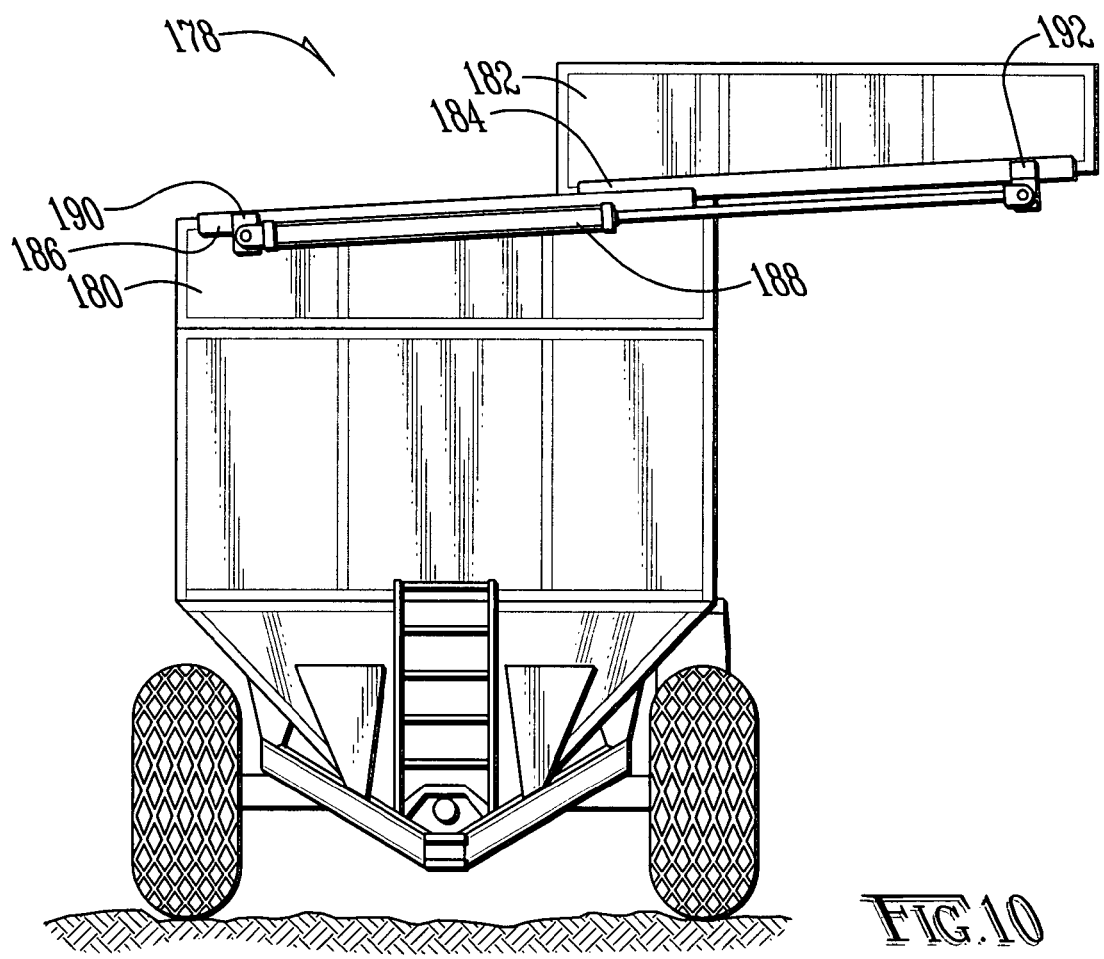
FIG. 10 illustrates a front elevation of the grain wagon of FIG. 9 in partial cutaway, receiving grain into a lower container.
Figure 11:
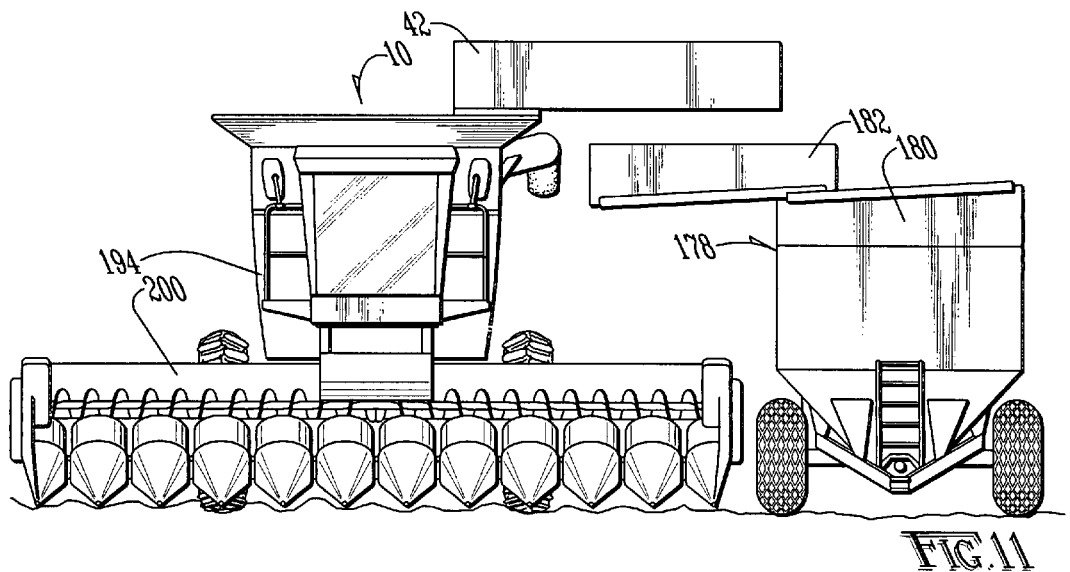
FIG. 11 illustrates a front elevation of the grain wagon of FIG. 9 in partial cutaway, receiving stover into an upper container.
Figure 12:
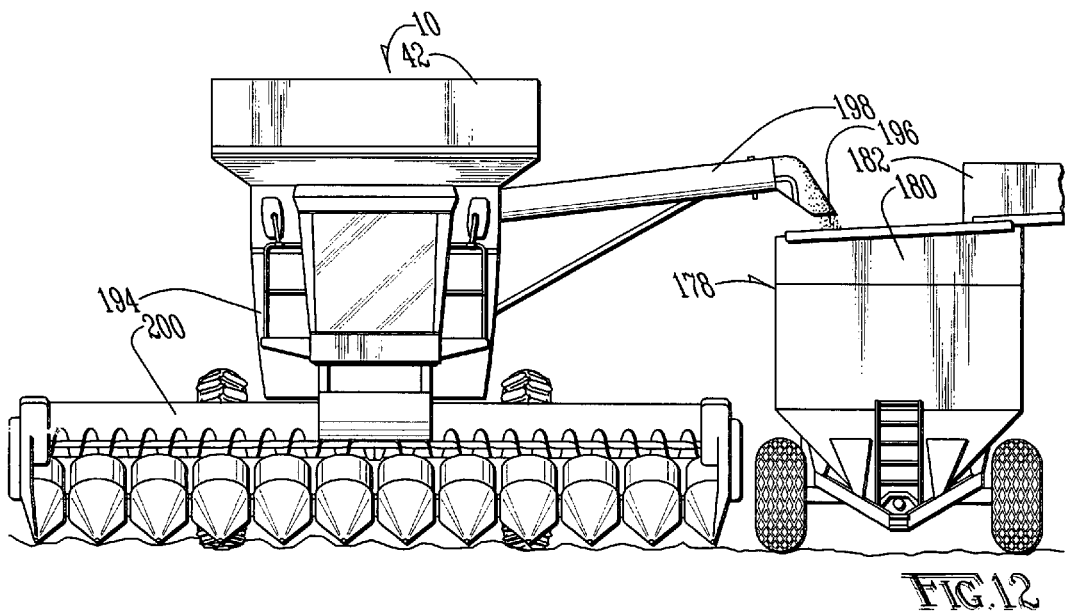
FIG. 12 illustrates a front elevation of the grain wagon of FIG. 9 receiving grain into a lower container through an auger.

When it is desired to load the lower tank (180), the hydraulic pistons (188) are actuated to extend the upper tank (182) relative to the lower tank (180) along the tracks (184) and (186). As shown in FIG. 10 and 12, this allows a combine (194) to fill the lower tank (180) with grain (196) or the like through an auger (198). Once the lower tank (180) has been filled as desired, the hydraulic pistons (188) are actuated to move the upper tank (182) along the tracks (184) and (186), back over the upper tank (182). If it is desired to fill the upper tank (182), as shown in FIG. 11, the hydraulic pistons may be actuated to move the upper tank (182) in an opposite direction relative to the lower tank (180) so as to cantilever the upper tank (182) over the lower tank (180). This positioning allows the upper tank (182) to extend closer to the combine (194) even in situations where the combine (194) is utilizing an oversized header (200), such as that shown in FIG. 11. If additional reach is required, the improved grain wagon (178) may be used in association with the improved combine (10) described above, to allow the upper tank (42) to cantilever relative to the combine (10), and the upper tank (182) to cantilever relative to the grain wagon (178). This orientation allows for extra wide clearance between the grain wagon (178) and combine (10).

Alternatively, the upper tank (182) may be filled with the grain wagon (178) in the orientation shown in FIG. 9, with the upper tank (182) positioned directly over the lower tank (180). As shown in FIGS. 10 and 11, the upper tank (182) and lower tank (180) are tapered, which allows the upper tank (182) to be raised higher in situations where it is desired to clear a grain auger or the like. The taper also allows the upper tank (182) to be extended in the opposite direction to reach a lower maximum height if it is desired to position the upper tank (182) of the grain wagon (178) under the upper tank (42) of a low profile combine.

Although the invention has been described with respect to a preferred embodiment thereof, it is to be understood that it is not to be so limited since changes and modifications can be made therein which are within the full, intended scope of this invention as defined by the appended claims.

What is claimed is:

1. A mobile agricultural transport comprising:
   (a) an agricultural material collection system;
   (b) an agricultural material container;
   (c) a first agricultural material transport provided between said agricultural material collection system and said agricultural material container;
   (d) an agricultural residue container located above said agricultural material container and defining a capacity of at least one cubic meter:
   (e) a second agricultural material transport provided between said agricultural material collection system and said agricultural residue container; and
   (f) a moving floor provided within said agricultural residue container.

2. The mobile agricultural transport of claim 1, wherein said agricultural material conveyor is configured to move agricultural residue across a floor of said agricultural residue container at least ten centimeters.

3. The mobile agricultural transport of claim 1, further comprising:
   (a) a frame coupled to said agricultural material container;
   (b) a wheel coupled to said frame; and
   (c) a motor coupled to said wheel.

4. A mobile agricultural transport comprising:
   (a) an agricultural material collection system;
   (b) an agricultural material container;
   (c) a first agricultural material transport provided between said agricultural material collection system and said agricultural material container;
   (d) an agricultural residue container located above said agricultural material container and defining a capacity of at least one cubic meter;
   (e) a second agricultural material transport provided between said agricultural material collection system and said agricultural residue container;
   an agricultural material conveyor coupled within said agricultural residue container; and
   (f) wherein said agricultural material conveyor is a pair of continuous side chains coupled to one another by a cross chain.

5. A mobile agricultural transport comprising:
   (a) an agricultural material collection system;
   (b) an agricultural material container;
   (c) a first agricultural material transport provided between said agricultural material collection system and said agricultural material container;
   (d) an agricultural residue container located above said agricultural material container and defining a capacity of at least one cubic meter;
   (e) a second agricultural material transport provided between said agricultural material collection system and said agricultural residue container;
   an agricultural material conveyor coupled within said agricultural residue container; and
   (f) further comprising a door provided in said agricultural residue container.

6. A mobile agricultural transport comprising:
   (a)
   (b)
   (c) an agricultural material container;
   (d) a grain transport, wherein the agricultural material container is located on the grain transport;
   (e) an agricultural residue container located above the agricultural material container and defining a capacity of at least one cubic meter; and
   (f) a moving floor provided within the agricultural residue container.

7. A mobile agricultural transport comprising:
   (a) an agricultural material collector;
   (b) a grain separator;
   (c) an agricultural material container;
   (d) a grain transport, wherein said first container is positioned to receive grain on said grain transport;
   (e) an agricultural residue container provided above said agricultural material container and defining a capacity of at least one cubic meter
   (f) an agricultural material transport, wherein said agricultural residue container is positioned to receive agricultural material from said agricultural material transport;
   (g) an agricultural material conveyor coupled to said agricultural residue container and provided below an uppermost portion of said agricultural residue container; and
   (h) wherein said agricultural material conveyor is a pair of continuous side chains coupled to one another by a cross chain.

8. A mobile agricultural transport comprising:
   (a) an agricultural material collector;
   (b) a grain separator;
   (c) an agricultural material container;
   (d) a grain transport, wherein said first container is positioned to receive grain on said grain transport;
   (e) an agricultural residue container provided above said agricultural material container and defining a capacity of at least one cubic meter
   (f) an agricultural material transport, wherein said agricultural residue container is positioned to receive agricultural material from said agricultural material transport;
   (g) an agricultural material conveyor coupled to said agricultural residue container and provided below an uppermost portion of said agricultural residue container; and
   (h) wherein said agricultural material conveyor is a motivator coupled to said agricultural residue container and configured to move at least a portion of said agricultural residue container at least ten centimeters relative to at least a portion of said agricultural material container.

9. The mobile agricultural transport of claim 8, wherein said motivator is a linear actuator.

* * * * *